United States Patent
Yoo et al.

(10) Patent No.: US 12,405,745 B2
(45) Date of Patent: Sep. 2, 2025

(54) STORAGE DEVICE AND OPERATING METHOD THEREOF

(71) Applicant: SAMSUNG ELECTRONICS CO., LTD., Suwon-si (KR)

(72) Inventors: Hyunjoon Yoo, Suwon-si (KR); Kyungduk Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 266 days.

(21) Appl. No.: 18/139,719

(22) Filed: Apr. 26, 2023

(65) Prior Publication Data

US 2023/0418511 A1 Dec. 28, 2023

(30) Foreign Application Priority Data

Jun. 28, 2022 (KR) .................. 10-2022-0079268

(51) Int. Cl.
*H04L 9/32* (2006.01)
*G06F 3/06* (2006.01)
*H04L 9/08* (2006.01)

(52) U.S. Cl.
CPC .......... *G06F 3/0655* (2013.01); *G06F 3/0604* (2013.01); *G06F 3/0679* (2013.01); *H04L 9/0866* (2013.01); *H04L 9/3278* (2013.01)

(58) Field of Classification Search
None
See application file for complete search history.

(56) References Cited

U.S. PATENT DOCUMENTS

| | | | |
|---|---|---|---|
| 9,218,159 B2 | 12/2015 | Seol et al. | |
| 9,542,157 B2 | 1/2017 | Falk et al. | |
| 10,855,477 B2 | 12/2020 | Hung et al. | |
| 11,209,993 B2 | 12/2021 | Fujita et al. | |
| 2015/0007337 A1 | 1/2015 | Krutzik | |
| 2018/0191512 A1* | 7/2018 | Tomishima | G09C 1/00 |
| 2019/0182054 A1 | 6/2019 | Leobandung | |
| 2020/0213138 A1 | 7/2020 | Mondello et al. | |
| 2022/0070004 A1* | 3/2022 | Liu | G06F 21/78 |
| 2023/0317162 A1* | 10/2023 | Nazarian | G11C 13/0023 365/148 |

FOREIGN PATENT DOCUMENTS

JP 6103958 B2 3/2017

* cited by examiner

*Primary Examiner* — Nelson S. Giddins
(74) *Attorney, Agent, or Firm* — Sughrue Mion, PLLC

(57) ABSTRACT

A storage device is provided. The storage device includes: a nonvolatile memory including memory cells divided into first and second memory cell groups; a memory controller; and a physically unclonable function (PUF) circuit configured to generate PUF data, based on an output of the second memory cell group, by excluding, from the output of the second memory cell group, outputs of a first exclusion area, a second exclusion area, and a third exclusion area, The first exclusion area has a threshold voltage equal to or greater than a first read level and less than a second read level, the second exclusion area has a threshold voltage less than a third read level that is less than the first read level, and the third exclusion area has a threshold voltage equal to or greater than a fourth read level that is greater than the second read level.

13 Claims, 11 Drawing Sheets

STORAGE DEVICE AND OPERATING METHOD THEREOF

CROSS-REFERENCE TO RELATED APPLICATION

This application claims priority to Korean Patent Application No. 10-2022-0079268, filed on Jun. 28, 2022, in the Korean Intellectual Property Office, the disclosure of which is incorporated by reference herein in its entirety.

BACKGROUND

The present disclosure relates to an electronic device, and more particularly, to a storage device having a physically unclonable function and a method of operating the storage device.

Due to demand for security of storage devices, storage devices having a physically unclonable function (PUF) have been developed. A PUF circuit may be implemented in semiconductor chips to generate random digital values that are difficult to predict by using process deviations generated in semiconductor fabrication processes. PUF-based storage devices may generate unique keys by using PUF circuits, and thus, the security of the storage devices may improve.

SUMMARY

One or more embodiments provide a storage device, which supports a physically unclonable function (PUF) by using a distribution of memory cells in the storage device, and a method of operating the storage device.

According to example embodiments, a storage device includes: a nonvolatile memory including a memory cell array of memory cells divided into a first memory cell group and a second memory cell group; a memory controller; and a physically unclonable function (PUF) circuit configured to generate PUF data, based on an output of the second memory cell group, by excluding, from the output of the second memory cell group, an output of a first exclusion area, an output of a second exclusion area, and an output of a third exclusion area. The first exclusion area has a threshold voltage equal to or greater than a first read level and less than a second read level, the second exclusion area has a threshold voltage less than a third read level that is less than the first read level, and the third exclusion area has a threshold voltage equal to or greater than a fourth read level that is greater than the second read level.

According to example embodiments, a storage device includes: a nonvolatile memory including a memory cell array; a physically unclonable function (PUF) circuit configured to generate PUF data, based on an output of the memory cell array; and a memory controller configured to transmit a first PUF data request signal to the PUF circuit, based on first authentication pin information received from a host, and generate a first authentication key based on the first authentication pin information and first PUF data received from the PUF circuit. The PUF circuit is further configured to generate the first PUF data by excluding, from the output of the memory cell array, an output of an edge bit cell group and an output of an intermediate bit cell group, and the edge bit cell group has a lowest threshold voltage or a highest threshold voltage, and the intermediate bit cell group has a threshold voltage corresponding to a PUF reference voltage level.

According to example embodiments, a method of operating a storage device, which includes a memory cell array and a physically unclonable function (PUF) circuit to support a PUF, includes: identifying a first memory cell group and a second memory cell group of the memory cell array; setting a first exclusion area, which has a threshold voltage equal to or greater than a first read level and less than a second read level, in the second memory cell group; setting a second exclusion area, which has a threshold voltage less than a third read level that is less than the first read level, in the second memory cell group; setting a third exclusion area, which has a threshold voltage equal to or greater than a fourth read level that is greater than the second read level, in the second memory cell group; setting a PUF reference voltage; obtaining an output of the second memory cell group by applying the PUF reference voltage to the second memory cell group; and generating PUF data by excluding, from the output of the second memory cell group, an output of the first exclusion area, an output of the second exclusion area, and an output of the third exclusion area.

BRIEF DESCRIPTION OF DRAWINGS

The above and other aspects and features will be more apparent from the following description of embodiments, taken in conjunction with the accompanying drawings, in which.

DETAILED DESCRIPTION

Hereinafter, embodiments will be described with reference to the accompanying drawings. Embodiments described herein are provided as examples, and thus, the present disclosure is not limited thereto, and may be realized in various other forms. Each embodiment provided in the following description is not excluded from being associated with one or more features of another example or another embodiment also provided herein or not provided herein but consistent with the present disclosure.

Figure 1:
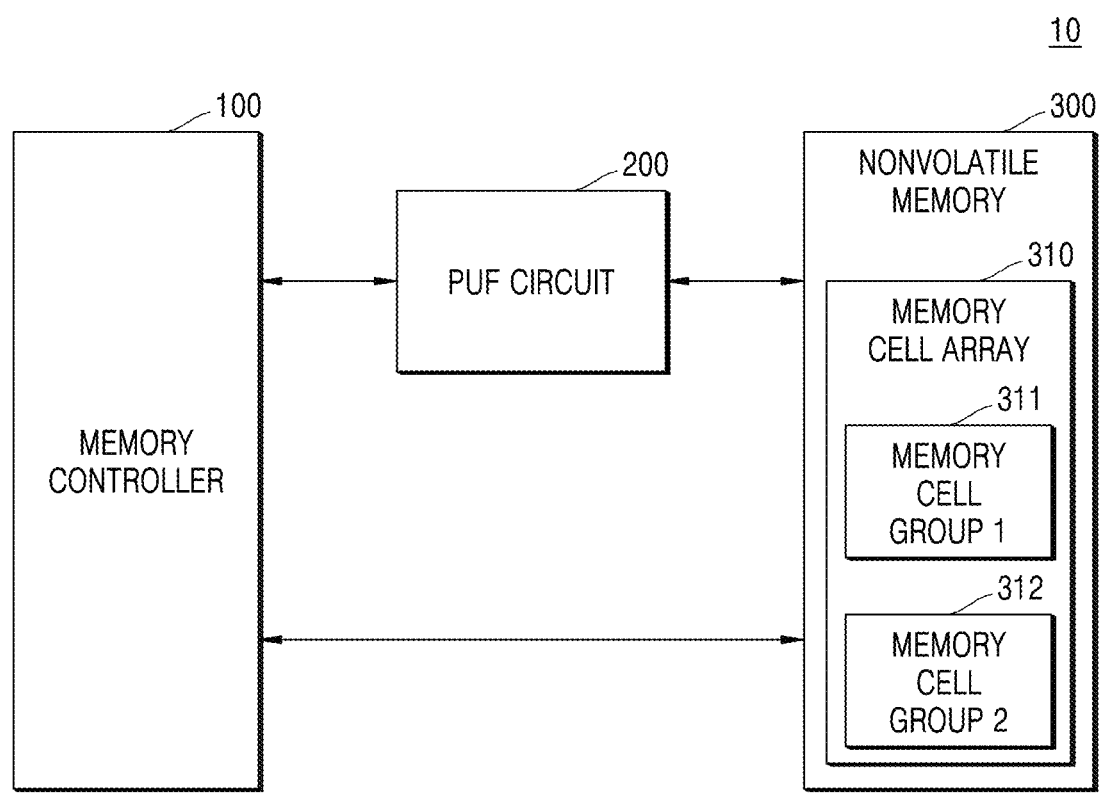
FIG. 1 is a block diagram illustrating a storage device according to an embodiment.

FIG. 1 is a block diagram illustrating a storage device 10 according to an embodiment.

Referring to FIG. 1, the storage device 10 may include a memory controller 100, a physically unclonable function (PUF) circuit 200, and a nonvolatile memory 300. The storage device 10 may be included or mounted in electronic devices, such as a personal computer, a server, a data center, a smartphone, a tablet PC, an autonomous vehicle, a handheld game console, a wearable device, and the like. For example, the storage device 10 may be implemented by a memory device, such as a solid-state drive (SSD).

The memory controller 100 may control the overall operation of the nonvolatile memory 300. Specifically, the memory controller 100 may control the nonvolatile memory 300 by providing a command, an address, and/or a control signal to the nonvolatile memory 300. The nonvolatile memory 300 may be operated according to control by the memory controller 100. The nonvolatile memory 300 may output stored data or store data provided by the memory controller 100, according to control by the memory controller 100.

The nonvolatile memory 300 may include a memory cell array 310 connected to a plurality of word lines and a plurality of bit lines. Herein, memory cells connected to each word line may be referred to as a page.

A row address from among addresses provided to the nonvolatile memory 300 from the memory controller 100 may indicate at least one of the word lines, and a column address from among the addresses may indicate at least one of the bit lines.

The memory cell array 310 may include a plurality of memory cells. The plurality of memory cells may include a plurality of flash memory cells. For example, the memory cells may include NAND flash memory cells. In some embodiments, each memory cell may include a single level cell (SLC) storing 1-bit information. According to other embodiments, each memory cell may include a cell storing 2-bit or more information, such as a multi-level cell (MLC), a triple level cell (TLC), or a quadruple level cell (QLC).

Figure 2:
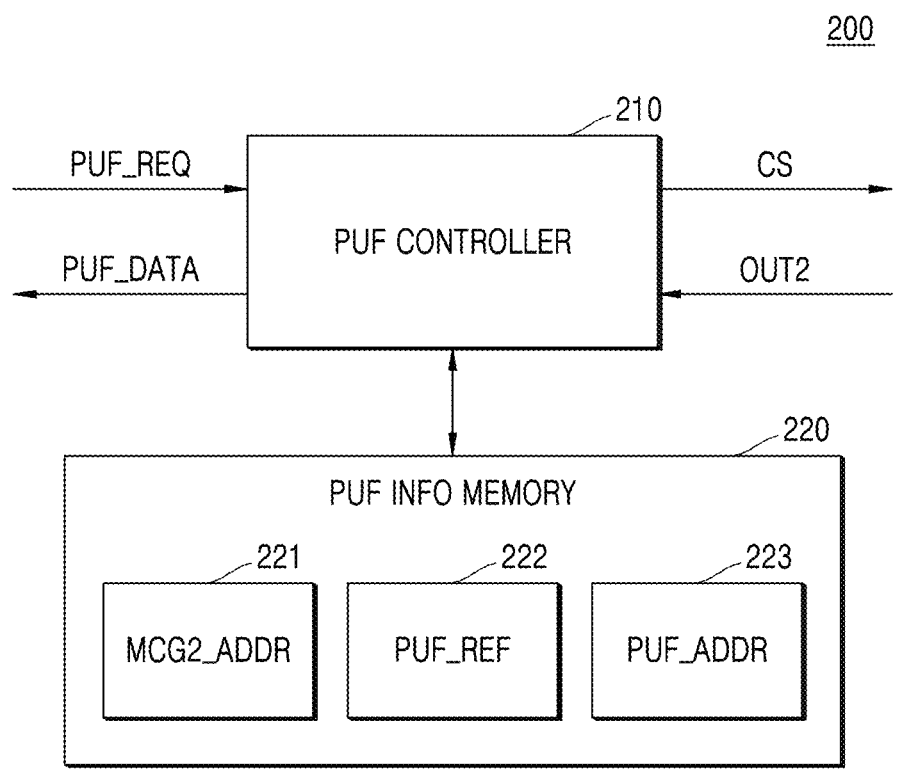
FIG. 2 is a block diagram illustrating a physically unclonable function (PUF) circuit according to an embodiment.

The plurality of memory cells may be set into a first memory cell group 311 and a second memory cell group 312, according to whether the memory cells are used for generating PUF data (for example, PUF_DATA in FIG. 2). Here, the first memory cell group 311 may represent memory cells not used to generate the PUF data, and the second memory cell group 312 may represent memory cells used for generating the PUF data.

In some embodiments, whether the memory cells are used for generating the PUF data may be determined according to whether the memory cells exhibit an abnormal distribution as a result of defense code. Herein, the defense code may refer to a software recovery algorithm used to reduce the deterioration of NAND flash memory, such as an SSD, by as much as possible. That is, the defense code may refer to an algorithm for reducing an error generated due to the deterioration of nonvolatile memory when the deterioration occurs in the nonvolatile memory. For example, the defense code may be executed to identify a read voltage allowing an error to be minimized while moving a read voltage level. The PUF circuit 200 may define a memory cell group exhibiting an abnormal distribution by applying the defense code to the memory cell array 310. The PUF circuit 200 may generate the PUF data by programming a memory cell group exhibiting an abnormal distribution as a result of applying the defense code, and then, by excluding an output of a certain area of the memory cell group according to a threshold voltage distribution. For example, the PUF circuit 200 may generate the PUF data by excluding, from an output of the memory cell group exhibiting an abnormal distribution, an output of an intermediate bit cell group close to the PUF reference voltage, an output of a lowest bit cell group having a lowest threshold voltage, and an output of a highest bit cell group having a highest threshold voltage.

In some embodiments, whether the plurality of memory cells are used for generating the PUF data may be determined according to whether the plurality of memory cells exhibit an abnormal distribution after performing a program operation thereon.

The program operation may include, for example, a one-shot program operation. Here, the one-shot program operation may refer to an operation in which, by applying a program voltage to a plurality of pages, respectively, memory cells connected to each of the plurality of pages are simultaneously programmed. The one-shot program operation is described in detail with reference to FIG. 4.

The program operation may include, as another example, a disturb program operation. Here, the disturb program operation may refer to an operation in which, by applying a disturb pass voltage to each of the plurality of pages, the memory cells are programmed to exhibit an abnormal distribution.

The disturb pass voltage may be a first disturb pass voltage or a second disturb pass voltage. The disturb pass voltage may refer to a voltage applied to a non-selected word line for intentionally programming the memory cells to exhibit an abnormal distribution.

In an embodiment, the memory controller 100 may program the memory cells, which are connected to program-permitted bit lines and non-selected word lines, to exhibit an abnormal distribution by applying the first disturb pass voltage to each of the non-selected word lines. The first disturb pass voltage may be greater than a pass voltage applied to the non-selected word line during a normal program operation. During the normal program operation, memory cells of a page to which the program voltage is applied may be programmed, and memory cells of a page to which the pass voltage is applied may not be programmed. On the other hand, memory cells of a page to which the first disturb pass voltage is applied may be programmed because a strong electric field is formed between a gate and a channel of each of the memory cells due to the first disturb pass voltage at a high level. Thus, the memory cells of the page to which the first disturb pass voltage is applied may exhibit an abnormal distribution.

In an embodiment, the memory controller 100 may program memory cells connected to program-inhibited bit lines and selected word lines to exhibit an abnormal distribution by applying the second disturb pass voltage to each of the non-selected word lines. The second disturb pass voltage may refer to a voltage that is less than the pass voltage used during the normal program operation. During the normal program operation, the memory cells connected to the program-inhibited bit lines and the selected word lines may not be programmed due to self-boosting. On the other hand, a channel of a cell string which is connected to a program-inhibited bit line and to which the second disturb pass voltage is applied, may not undergo sufficient self-boosting. Accordingly, the memory cells connected to the program-inhibited bit lines and the selected word lines may be programmed due to the strong electric field between the gate and the channel of each thereof. Therefore, the memory cells connected to the program-inhibited bit lines and the selected word lines may exhibit an abnormal distribution.

However, embodiments are not limited thereto, a method of programming a memory cell array to obtain a distribution of memory cells may be variously implemented.

A method of setting the first memory cell group 311 and the second memory cell group 312 may be variously implemented in addition to the aforementioned setting method according to a distribution of memory cells.

For example, when a memory cell array includes first to N-th pages, the first to k-th pages may be set into the first memory cell group 311, and the k+1-th to N-th pages may be set into the second memory cell group 312 (where k and N are each a natural number greater than 1, and k<N).

The memory controller 100 may access the first memory cell group 311. For example, the memory controller 100 may control the nonvolatile memory 300 to store data in the first memory cell group 311 by providing a command, an address, a control signal, and the data to the nonvolatile memory 300. In addition, the nonvolatile memory 300 may output the data stored in the first memory cell group 311, according to control by the memory controller 100.

The memory controller 100 may perform a program operation on the memory cell array 310, and the PUF circuit 200 may set the second memory cell group 312, based on a result of the program operation. For example, the PUF circuit 200 may set an area exhibiting an abnormal distribution as a result of the program operation into the second memory cell group 312. The PUF circuit 200 may store an address of the second memory cell group 312, which is set based on the result of the program operation, in a PUF information memory 220.

The PUF circuit 200 may set the PUF reference voltage, based on the distribution of the second memory cell group 312, which is obtained as the result of the program operation. In an embodiment, the PUF circuit 200 may set, as the PUF reference voltage, a threshold voltage of a memory cell corresponding to the upper 50% in the distribution of the second memory cell group 312. In an embodiment, the PUF circuit 200 may set, as the PUF reference voltage, an average of the highest threshold voltage value and the lowest threshold voltage value in the distribution of the second memory cell group 312. In addition, the PUF circuit 200 may store the PUF reference voltage in the PUF information memory 220, after the program operation.

The PUF reference voltage may be used to obtain the output (for example, OUT2 in FIG. 2) of the second memory cell group 312. For example, when the PUF reference voltage is applied to the second memory cell group 312, memory cells having threshold voltages equal to or greater than the PUF reference voltage, from among the memory cells of the second memory cell group 312, may output a first bit value, and memory cells having threshold voltages less than the PUF reference voltage, from among the memory cells of the second memory cell group 312, may output a second bit value. For example, the memory cells having threshold voltages equal to or greater than the PUF reference voltage may output "0", and the memory cells having threshold voltages less than the PUF reference voltage may output "1".

The PUF circuit 200 may generate the PUF data, based on outputs of the second memory cell group 312. Specifically, the PUF circuit 200 may generate the PUF data by excluding, from the output of the second memory cell group 312, an output of an intermediate bit cell group having a threshold voltage equal to or greater than a first read level and less than a second read level, an output of a lowest bit cell group having a threshold voltage less than a third read level that is less than the first read level, and an output of a highest bit cell group having a threshold voltage equal to or greater than a fourth read level that is greater than the second read level.

Because the output of the intermediate bit cell group may correspond to memory cells close to the PUF reference voltage, the value of the output may vary based on a slight change in the PUF reference voltage. That is, when the output of the intermediate bit cell group is used as the PUF data, the stability of the PUF data may deteriorate. Therefore, the PUF circuit 200 may generate the PUF data by excluding the output of the intermediate bit cell group. Because the output of the intermediate bit cell group is excluded, there is an effect of improving the stability of the PUF data.

Memory cells included in the lowest bit cell group or the highest bit cell group may correspond to memory cells close to a ground terminal or a power terminal, depending on a structure of the memory cell array 310. Thus, outputs of the memory cells included in the lowest bit cell group or the highest bit cell group may be predicted through the structure of the memory cell array 310. That is, when the lowest bit cell group or the highest bit cell group is used for generating the PUF data, the security of the PUF data may deteriorate. Therefore, the PUF circuit 200 may generate the PUF data by excluding the output of the lowest bit cell group or the output of the highest bit cell group. Because the output of the lowest bit cell group or the highest bit cell group is excluded, there is an effect of improving the security of the PUF data.

The intermediate bit cell group may refer to memory cells of a bit value close to the PUF reference voltage. For example, when a cell of the nonvolatile memory 300 is a TLC storing 3-bit information and a bit value close to the PUF reference voltage is 101, the intermediate bit cell group may represent memory cells (for example, 523 in FIG. 5B) corresponding to the bit value of 101.

The highest bit cell group may represent memory cells of a bit value corresponding to a highest threshold voltage. For example, in memory cells that are TLCs, when a bit value corresponding to a highest threshold voltage is 110, the highest bit cell group may represent memory cells (for example, 527 in FIG. 5B) corresponding to the bit value of 110.

The lowest bit cell group may represent memory cells of a bit value corresponding to a lowest threshold voltage. For example, in memory cells that are TLCs, when a bit value corresponding to a lowest threshold voltage is 111, the lowest bit cell group may represent memory cells (for example, 520 in FIG. 5B) corresponding to the bit value of 111.

In some embodiments, the PUF data may also be referred to as "random data" or "unique data". The memory controller 100 may generate an authentication key, a random key, or a unique key by using the PUF data.

Specifically, the PUF circuit 200 may generate a unique value, that is, an output voltage, which corresponds to hardware, based on intrinsic characteristics of the hardware. For example, even when a plurality of pieces of hardware, such as semiconductor elements included in a semiconductor chip, are fabricated by the same semiconductor process, the plurality of pieces of hardware may not be completely consistent with each other physically, and slight variations may be generated in the plurality of pieces of hardware. Based on such variations, a unique value of a piece of hardware may be extracted, and the extracted value may be used for applications requiring security, for example, secure communication, secure data processing, user identification, firmware update, and the like. The PUF data may refer to a unique value or a set of unique values, generated based on the variations set forth above.

In an embodiment, the memory controller 100 may transmit a PUF data request signal (for example, PUF_REQ in FIG. 2) to the PUF circuit 200, based on an authentication request from a host (for example, 20 in FIG. 9A), and may generate an authentication key, based on the PUF data received from the PUF circuit 200.

FIG. 2 is a block diagram illustrating the PUF circuit 200 according to an embodiment. The PUF circuit 200 may include a PUF controller 210 and a PUF information memory 220. Descriptions regarding FIG. 2 may be made with reference to FIG. 1.

The PUF controller 210 may transmit a control signal CS to the nonvolatile memory 300, based on a PUF data request signal PUF_REQ received from the memory controller 100. The control signal CS may refer to a signal for obtaining an output OUT2 of the second memory cell group 312 of the nonvolatile memory 300. The control signal CS may indicate an address 221 of the second memory cell group 312 and a PUF reference voltage 222.

Because, after a program operation, the PUF information memory 220 may store the address 221 of the second memory cell group 312 and the PUF reference voltage 222, the PUF controller 210 may generate the control signal CS indicating the address 221 of the second memory cell group 312 and the PUF reference voltage 222, which are read from the PUF information memory 220.

The PUF controller 210 may receive the output OUT2 of the second memory cell group 312 from the nonvolatile memory 300 and thus generate PUF data PUF_DATA. Specifically, as shown in FIG. 6, the PUF controller 210 may generate the PUF data PUF_DATA by excluding, from the output OUT2 of the second memory cell group 312, an output of the intermediate bit cell group having a threshold voltage equal to or greater than a first read level and less than a second read level, an output of the lowest bit cell group having a threshold voltage less than a third read level that is less than the first read level, and an output of the highest bit cell group having a threshold voltage equal to or greater than a fourth read level that is greater than the second read level.

Figure 6:
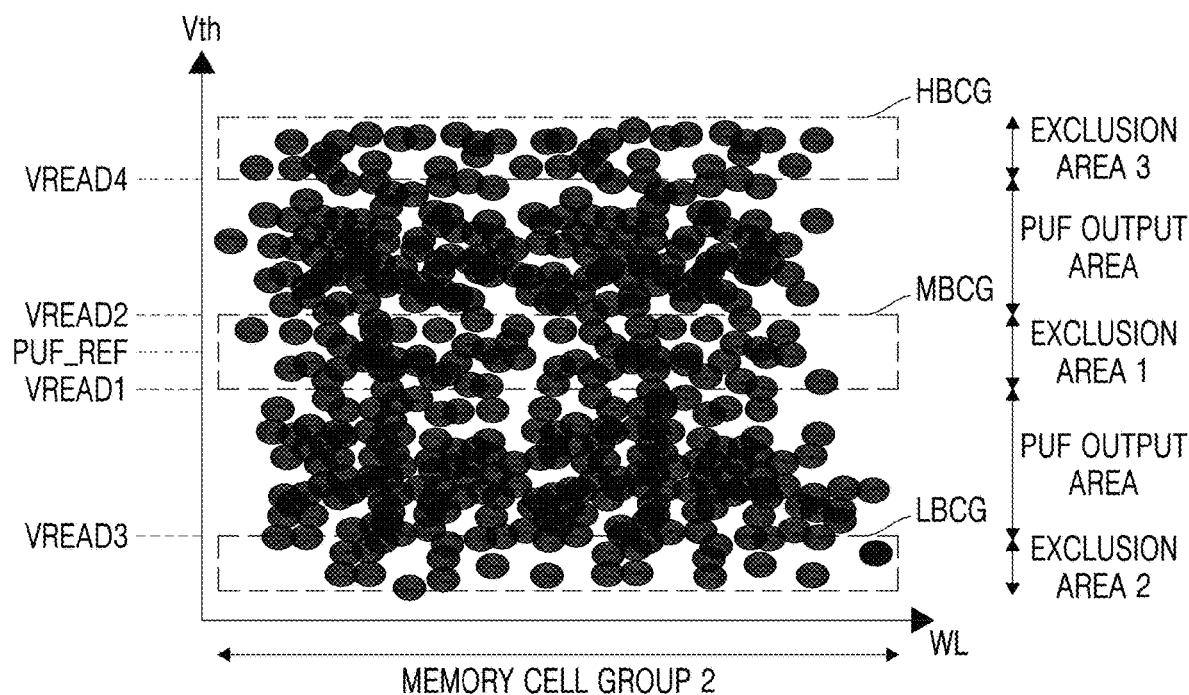
FIG. 6 is a diagram illustrating a distribution of threshold voltages of a second memory cell group, according to an embodiment.

The PUF controller 210 may identify the number of pieces of PUF data PUF_DATA and, when the number of pieces of PUF data PUF_DATA is greater than a threshold level, may store, in the PUF information memory 220, an address 223 of an area (hereinafter referred to as a "PUF output area") obtained by excluding a first exclusion area, a second exclusion area, and a third exclusion area from the second memory cell group 312, as shown in FIG. 6.

The threshold level may refer to a proportion of the number of memory cells of the PUF output area with respect to the number of memory cells of the second memory cell group 312. For example, when the number of memory cells of the second memory cell group 312 is 256 and the number of memory cells of the PUF output area is 128, the threshold level may be 50%.

In an embodiment, when the number of memory cells of the PUF output area is less than the threshold level, the PUF data PUF_DATA may be generated by repeatedly reading the memory cells of the same PUF output area.

In an embodiment, when the number of memory cells of the PUF output area is equal to or less than the threshold level, another area in the memory cell array 310 may be set to the second memory cell group 312, and then, the PUF output area may be set.

After the address 223 of the PUF output area is stored in the PUF information memory 220, when the PUF data PUF_DATA needs to be generated, the PUF controller 210 may read, from the PUF information memory 220, the address 221 of the second memory cell group 312, the PUF reference voltage 222, and the address 223 of the PUF output area.

The PUF controller 210 may transfer, to the second memory cell group 312, the control signal CS indicating the address 221 of the second memory cell group 312 and the PUF reference voltage 222. The nonvolatile memory 300 may provide, to the PUF controller 210, the output OUT2 of the second memory cell group 312, which is generated by applying the PUF reference voltage 222 to the second memory cell group 312, based on the control signal CS.

The PUF controller 210 may generate the PUF data PUF_DATA, based on the address 223 of the PUF output area, which is read from the PUF information memory 220. For example, the PUF controller 210 may cause the output OUT2 of the second memory cell group 312 to be included in the PUF data PUF_DATA when the output OUT2 of the second memory cell group 312 received from the nonvolatile memory 300 is an output of a memory cell corresponding to the address 223 of the PUF output area, and may cause the output OUT2 of the second memory cell group 312 to be not included in the PUF data PUF_DATA when the output OUT2 of the second memory cell group 312 is an output of a memory cell not corresponding to the address 223 of the PUF output area.

Figure 3:
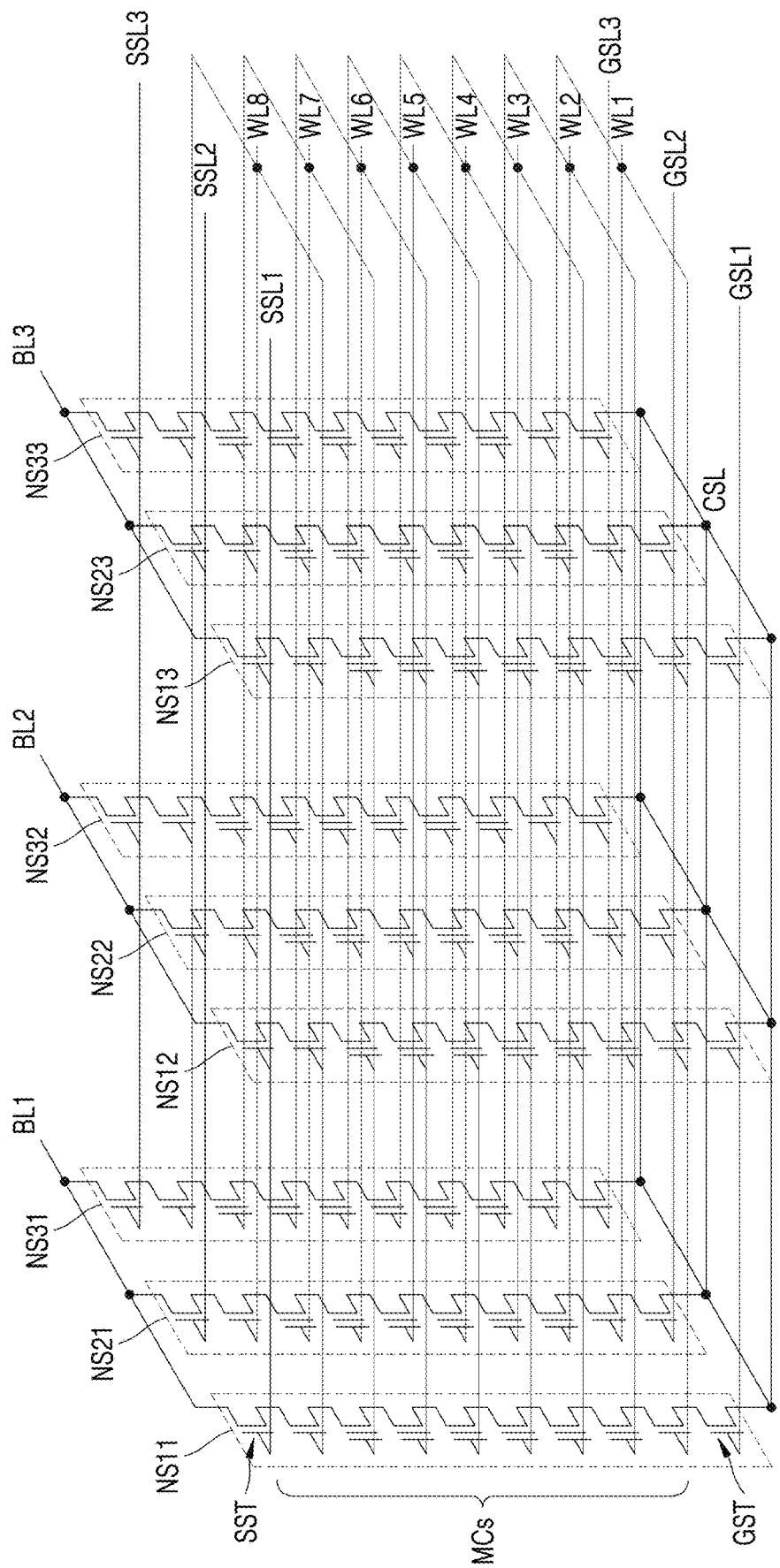
FIG. 3 is a circuit diagram illustrating a memory block according to an embodiment.

FIG. 3 is a circuit diagram illustrating a memory block according to an embodiment. Referring to FIG. 3, a memory block BLK1 may include NAND strings NS11 to NS33, and each NAND string (for example, NS11) may include a string select transistor SST, a plurality of memory cells MCs, and a ground select transistor GST, which are connected in series. The string select and ground select transistors SST and GST and the memory cells MCs, which are included in each NAND string, may form a structure stacked in a vertical direction over a substrate.

Word lines WL1 to WL8 may extend in a second horizontal direction, and bit lines BL1 to BL3 may extend in a first horizontal direction. The NAND strings NS11, NS21, and NS31 may be arranged between a first bit line BL1 and a common source line CSL, and the NAND strings NS12, NS22, and NS32 may be arranged between a second bit line BL2 and the common source line CSL. The NAND strings NS13, NS23, and NS33 may be arranged between a third bit line BL3 and the common source line CSL. The string select transistors SST may be respectively connected to string select lines SSL1 to SSL3 corresponding thereto. The memory cells MCs may be respectively connected to the word lines WL1 to WL8 corresponding thereto. The ground select transistors GST may be respectively connected to ground select lines GSL1 to GSL3 corresponding thereto. The string select transistors SST may be respectively connected to the bit lines BL1 to BL3 corresponding thereto, and the ground select transistors GST may be connected to the common source line CSL. Here, the number of NAND strings, the number of word lines, the number of bit lines, the number of ground select lines, and the number of string select lines may vary depending on embodiments.

Figure 4:
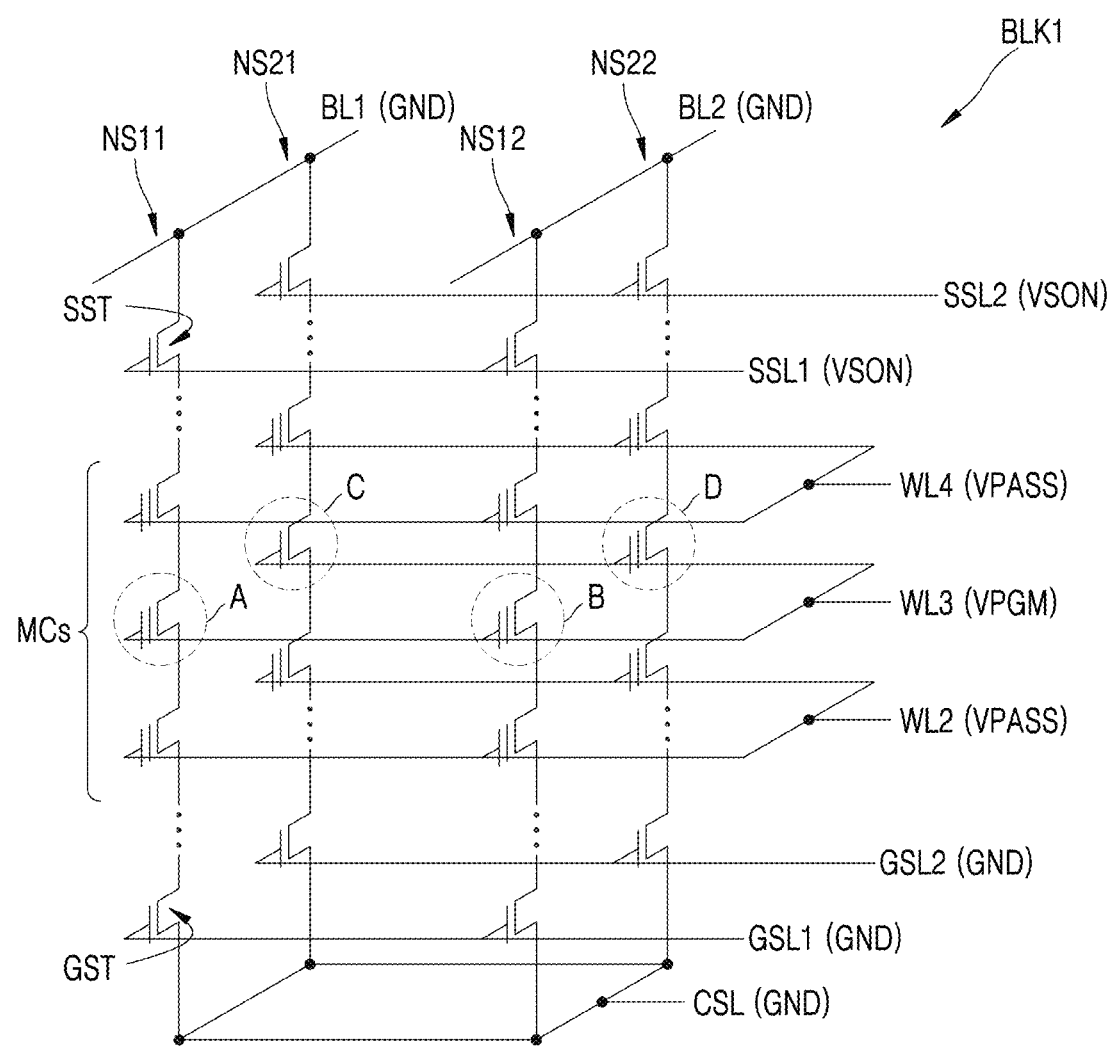
FIG. 4 is a circuit diagram illustrating a one-shot program operation according to an embodiment.

FIG. 4 is a circuit diagram illustrating a one-shot program operation according to an embodiment. Memory cells connected to a word line, to which a program voltage is applied, may be simultaneously programmed through a one-shot program operation.

Referring to FIG. 4, to perform the one-shot program operation, the first bit line BL1 and the second bit line BL2 may be program-permitted bit lines, to which a low program-permit voltage, for example, a ground voltage GND, is applied.

In addition, a turn-on voltage VSON, which is equal to or greater than a threshold voltage Vth of each of the select transistors SST, may be applied to the string select lines SSL1 and SSL2 connected to the NAND strings NS11 to NS22.

A turn-off voltage at a level of the ground voltage GND may be applied to the ground select lines GSL1 and GSL2. The ground voltage GND may be applied to the common source line CSL. A program voltage VPGM (for example, 18 V) may be applied to a selected word line (for example, WL3), a pass voltage VPASS (for example, 8 V) may be applied to non-selected word lines (for example, WL2 and WL4).

Also, a disturb program operation may be performed in an embodiment. That is, memory cells may be programmed to exhibit an abnormal distribution by applying a disturb pass voltage to a word line connected to each of the plurality of pages.

For example, a first disturb pass voltage may be applied to the non-selected word lines WL2 and WL4. In this case, memory cells connected to the program-permitted bit lines BL1 and BL2 and the non-selected word lines WL2 and WL4 may be programmed to exhibit an abnormal distribution. The first disturb pass voltage may be greater than the pass voltage VPASS applied to non-selected word lines during the one-shot program operation. Memory cells of a page, to which the first disturb pass voltage is applied, may be programmed, because a strong electric field is formed between a gate and a channel of each of the memory cells due to the first disturb pass voltage that is at a high level. Accordingly, the memory cells of the page, to which the first disturb pass voltage is applied, may exhibit an abnormal distribution. Under such program bias conditions, 18 V may be applied to gates of memory cells A, B, C, and D, and channel voltages thereof may be 0 V. Because a strong electric field may be formed between the gate and the channel of each of the memory cells A, B, C, and D, the memory cells A, B, C, and D may be programmed.

Figure 5A:
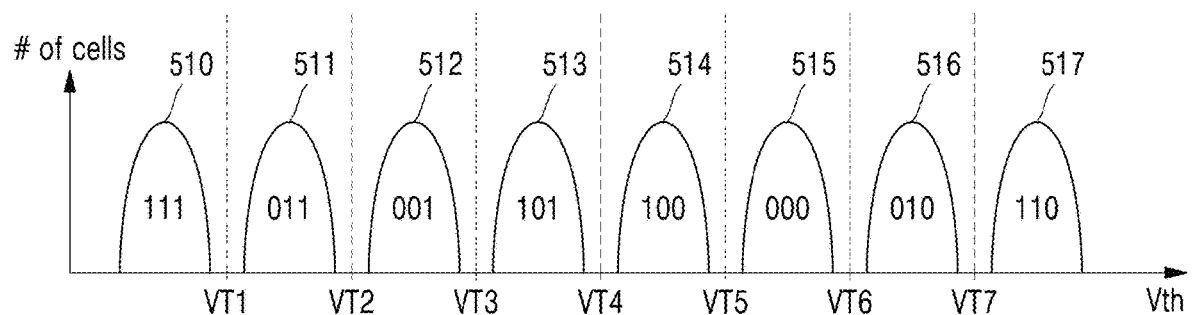
FIGS. 5A and 5B are diagrams each illustrating a distribution of a memory cell array, according to an embodiment.
Figure 5B:
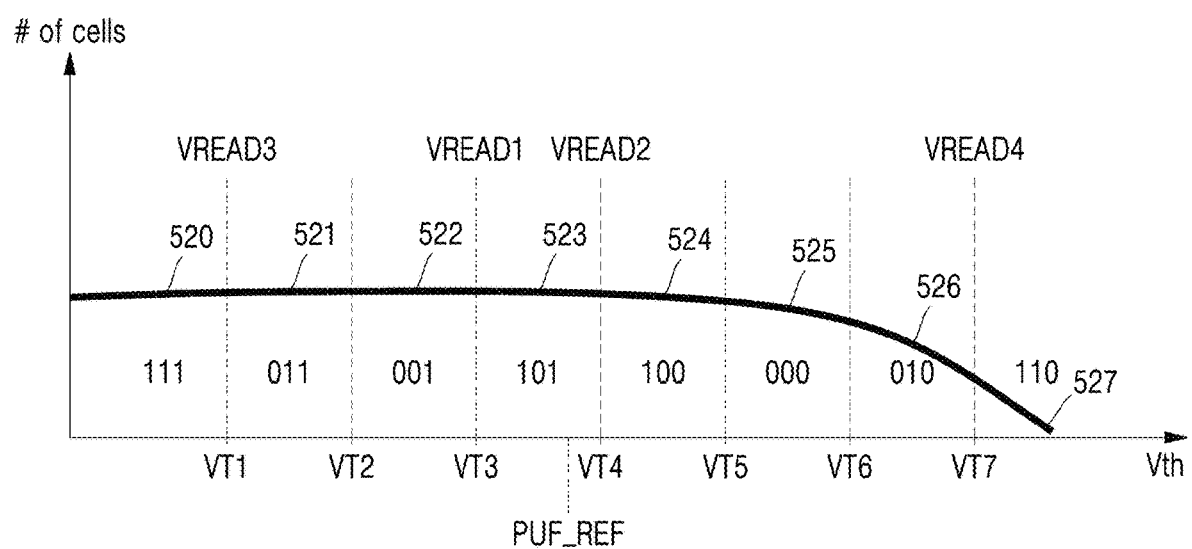

FIGS. 5A and 5B are diagrams each illustrating a distribution of a memory cell array, according to an embodiment. Descriptions regarding FIGS. 5A and 5B may be made with reference to FIGS. 1 and 4. FIGS. 5A and 5B each illustrate the number of memory cells according to a threshold voltage distribution of memory cells that are TLCs, as an example. FIG. 5A is a diagram illustrating the first memory cell group 311 exhibiting a normal distribution, as a result of a program operation, and FIG. 5B is a diagram illustrating the second memory cell group 312 exhibiting an abnormal distribution. The normal distribution may mean that, as a result of a program operation, memory cells exhibit a Gaussian distribution within a threshold voltage for classifying each bit value. The abnormal distribution may refer to a distribution in which, as a result of a program operation, memory cells representing each bit value spread throughout the threshold voltage for classifying each bit value.

Referring to FIG. 5A, the memory cells of the first memory cell group 311 may be classified into memory cells 510 of a bit value of 111 to memory cells 517 of a bit value of 110, based on first to seventh threshold voltages VT1 to VT7. For example, a memory cell of the first memory cell group 311, which has a threshold voltage equal to or greater than the second threshold voltage VT2 and less than the third threshold voltage VT3, may be one of the memory cells 512 of a bit value of 001.

Referring to FIG. 5B, the memory cells of the second memory cell group 312 may be classified into memory cells 520 of a bit value of 111 to memory cells 527 of a bit value of 110, based on the first to seventh threshold voltages VT1 to VT7. For example, a memory cell of the second memory cell group 312, which has a threshold voltage equal to or greater than the fourth threshold voltage VT4 and less than the fifth threshold voltage VT5, may be one of the memory cells 524 of a bit value of 100.

FIG. 5B illustrates an example in which the PUF reference voltage is between the third threshold voltage VT3 and the fourth threshold voltage VT4. Because a bit value close to the PUF reference voltage is 101, the intermediate bit cell group may represent the memory cells 523 of a bit value of 101. Because a first read level VREAD1 and a second read level VREAD2 may refer to threshold voltages for classifying the intermediate bit cell group, the first read level VREAD1 and the second read level VREAD2 may be respectively set to be the third threshold voltage VT3 and the fourth threshold voltage VT4. That is, memory cells having threshold voltages equal to or greater than the first read level VREAD1 and less than the second read level VREAD2 may correspond to the intermediate bit cell group.

Because a bit value corresponding to the lowest threshold voltage is 111, the lowest bit cell group may represent the memory cells 520 of a bit value of 111. Because a third read level VREAD3 may refer to a threshold voltage for classifying the lowest bit cell group, the third read level VREAD3 may be set to be the first threshold voltage VT1. That is, memory cells having threshold voltages less than the third read level VREAD3 may correspond to the lowest bit cell group.

Because a bit value corresponding to the highest threshold voltage is 110, the highest bit cell group may represent the memory cells 527 of a bit value of 110. Because a fourth read level VREAD4 may refer to a threshold voltage for classifying the highest bit cell group, the fourth read level VREAD4 may be set to be the seventh threshold voltage VT7. That is, memory cells having threshold voltages equal to or greater than the fourth read level VREAD4 may correspond to the highest bit cell group.

FIG. 6 is a diagram illustrating a distribution of threshold voltages of a second memory cell group, according to an embodiment. Descriptions regarding FIG. 6 may be made with reference to FIGS. 1 and 5B. FIG. 6 illustrates an example in which the second memory cell group 312 exhibiting an abnormal distribution is set in a certain range of the word lines WL.

An intermediate bit cell group MBCG, which has a bit value close to the PUF reference voltage as shown in FIG. 5B, is illustrated in FIG. 6. The intermediate bit cell group MBCG may correspond to the memory cells 523 of a bit value of 101 in FIG. 5B. In addition, threshold voltages for classifying the intermediate bit cell group MBCG may be the first read level VREAD1 and the second read level VREAD2. That is, memory cells having threshold voltages equal to or greater than the first read level VREAD1 and less than the second read level VREAD2 may correspond to the intermediate bit cell group MBCG. Because the PUF circuit 200 may exclude an output of the intermediate bit cell group MBCG during the process of generating the PUF data PUF_DATA, the intermediate bit cell group MBCG may be herein referred to as a "first exclusion area (that is, EXCLUSION AREA 1)".

A lowest bit cell group LBCG having a lowest threshold voltage is shown in FIG. 6. The lowest bit cell group LBCG may correspond to the memory cells 520 of a bit value of 111 in FIG. 5B. A threshold voltage for classifying the lowest bit cell group LBCG may be the third read level VREAD3. That is, memory cells having threshold voltages less than the third read level VREAD3 may correspond to the lowest bit cell group LBCG. Because the PUF circuit 200 may exclude an output of the lowest bit cell group LBCG during the process of generating the PUF data PUF_DATA, the lowest bit cell group LBCG may be herein referred to as a "second exclusion area (that is, EXCLUSION AREA 2)".

A highest bit cell group HBCG having a highest threshold voltage is shown in FIG. 6. The highest bit cell group HBCG may correspond to the memory cells 527 of a bit value of 110 in FIG. 5B. A threshold voltage for classifying the highest bit cell group HBCG may be the fourth read level VREAD4. That is, memory cells having threshold voltages equal to or greater than the fourth read level VREAD4 may correspond to the highest bit cell group HBCG. Because the PUF circuit 200 may exclude an output of the highest bit cell group HBCG during the process of generating the PUF data PUF_DATA, the highest bit cell group HBCG may be herein referred to as a "third exclusion area (that is, EXCLUSION AREA 3)".

In an embodiment, the PUF circuit 200 may exclude an output of a memory cell group, which repeatedly outputs only one bit value, during the process of generating the PUF data PUF_DATA, in addition to excluding the output of the lowest bit cell group LBCG and the output of the highest bit cell group HBCG during the process of generating the PUF data PUF_DATA. For example, when a certain memory cell group repeatedly outputs only a bit value of "0" or repeatedly outputs only a bit value of "1", the PUF circuit 200 may exclude the output of the memory cell group during the process of generating the PUF data PUF_DATA. When the output of the memory cell group repeatedly outputting only one bit value is used as the PUF data PUF_DATA, because the PUF data PUF_DATA may be easily predicted, the PUF circuit 200 may exclude the output of the memory cell group repeatedly outputting only one bit value during the process of generating the PUF data PUF_DATA. Because the PUF circuit 200 may generate the PUF data PUF_DATA by excluding, from the output OUT2 of the second memory cell group 312, the output of the first exclusion area EXCLUSION AREA 1, the output of the second exclusion area EXCLUSION AREA 2, and the output of the third exclusion area EXCLUSION AREA 3, the remaining area in the second memory cell group 312 except for the first exclusion area EXCLUSION AREA 1, the second exclusion area EXCLUSION AREA 2, and the third exclusion area EXCLUSION AREA 3 may be referred to as a "PUF output area".

In an embodiment, the PUF circuit 200 may generate the PUF data PUF_DATA by excluding, from the output OUT2 of the second memory cell group 312, at least one of the output of the first exclusion area EXCLUSION AREA 1 to the output of the third exclusion area EXCLUSION AREA 3. For example, the PUF circuit 200 may generate the PUF data PUF_DATA by excluding, from the output OUT2 of the second memory cell group 312, the output of the first exclusion area EXCLUSION AREA 1 and the output of the second exclusion area EXCLUSION AREA 2. In this case, the remaining area in the second memory cell group 312 except for the first exclusion area EXCLUSION AREA 1 and the second exclusion area EXCLUSION AREA 2 may be referred to as a "PUF output area".

The output OUT2 of the second memory cell group 312 may be generated by applying the PUF reference voltage to the second memory cell group 312. Among the memory cells of the second memory cell group 312, memory cells having threshold voltages equal to or greater than the PUF reference voltage may output a first bit value, and memory cells having threshold voltages less than the PUF reference voltage may output a second bit value. For example, the memory cells having threshold voltages equal to or greater than the PUF reference voltage may output data of "0", and the memory cells having threshold voltages less than the PUF reference voltage may output data of "1".

In an embodiment, the PUF reference voltage may be set to a threshold voltage corresponding to the upper 50% of the threshold voltages of the second memory cell group 312. In an embodiment, the PUF reference voltage may be set to an average value of the highest threshold voltage and the lowest threshold voltage among the threshold voltages of the second memory cell group 312.

Figure 7:
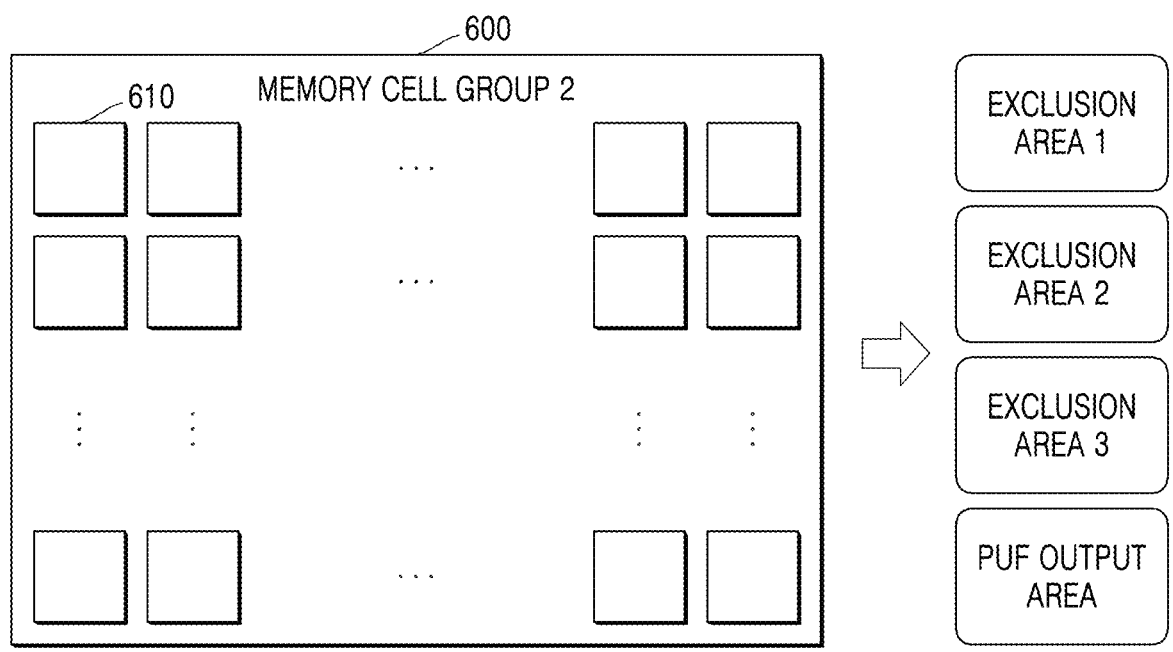
FIG. 7 is a block diagram illustrating an operation of setting a physically unclonable function (PUF) output area, according to an embodiment.

FIG. 7 is a block diagram illustrating an operation of setting a PUF output area, according to an embodiment. Descriptions regarding FIG. 7 may be made with reference to FIGS. 1 and 6.

A second memory cell group 600 may include a plurality of memory cells. For example, the second memory cell group 600 may include 256 memory cells. The PUF circuit 200 may classify memory cells 610 of the second memory cell group 600 into one of the first exclusion area EXCLUSION AREA 1, the second exclusion area EXCLUSION AREA 2, the third exclusion area EXCLUSION AREA 3, and the PUF output area (that is, "PUF OUTPUT AREA"), based on threshold voltages thereof.

As shown in FIG. 6, the PUF circuit 200 may set memory cells having threshold voltages equal to or greater than the first read level VREAD1 and less than the second read level VREAD2, from among the memory cells included in the second memory cell group 600, into the first exclusion area EXCLUSION AREA 1.

The PUF circuit 200 may set memory cells having threshold voltages less than the third read level VREAD3, which is less than the first read level VREAD1, into the second exclusion area EXCLUSION AREA 2.

The PUF circuit 200 may set memory cells having threshold voltages equal to or greater than the fourth read level VREAD4, which is greater than the second read level VREAD2, into the third exclusion area EXCLUSION AREA 3.

The PUF circuit 200 may set memory cells, which are not included in the first exclusion area EXCLUSION AREA 1, the second exclusion area EXCLUSION AREA 2, and the third exclusion area EXCLUSION AREA 3, in the second memory cell group 600 into the PUF output area.

Figure 8:
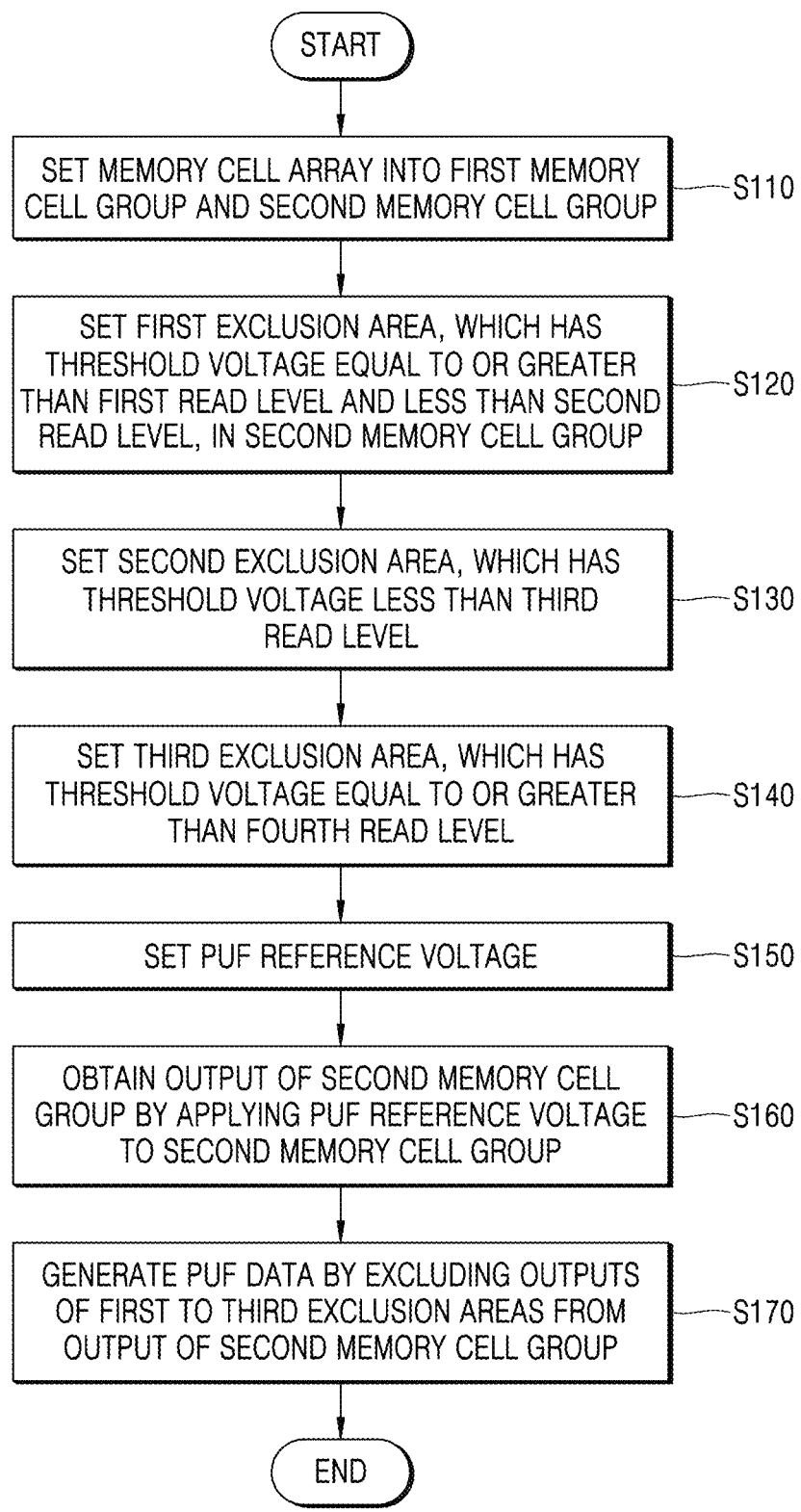
FIG. 8 is a flowchart illustrating a method of operating a storage device, according to an embodiment.

FIG. 8 is a flowchart illustrating a method of operating a storage device, according to an embodiment. Descriptions regarding FIG. 8 may be made with reference to FIGS. 1 and 2.

The storage device 10 supporting a PUF may include the memory cell array 310 and the PUF circuit 200. The method of operating a storage device may include operations S110 to S170.

In operation S110, the memory cell array 310 may be set into the first memory cell group 311 and the second memory cell group 312. The PUF circuit 200 may set memory cells used for generating the PUF data PUF_DATA into the second memory cell group 312 and set the remaining memory cells into the first memory cell group 311.

In an embodiment, the PUF circuit 200 may set any area in the memory cell array 310 into the second memory cell group 312, regardless of a distribution of memory cells.

In an embodiment, a program operation may be performed on the memory cell array 310 including a plurality of pages. Specifically, memory cells connected to each of the plurality of pages may be simultaneously programmed by applying a program voltage (for example, VPGM in FIG. 4) to each of the plurality of pages. As a result of the program operation, pages having a normal distribution may be set into the first memory cell group 311, and pages having an abnormal distribution may be set into the second memory cell group 312.

The PUF circuit 200 may set memory cells exhibiting an abnormal distribution, from among the memory cells having undergone the program operation, into the second memory cell group 312 and set memory cells exhibiting a normal distribution into the first memory cell group 311.

In operation S120, in the second memory cell group 312, a first exclusion area (EXCLUSION AREA 1 in FIG. 6) having threshold voltages equal to or greater than the first read level VREAD1 and less than the second read level VREAD2 may be set. The PUF circuit 200 may set memory cells having a bit value close to the PUF reference voltage into the first exclusion area EXCLUSION AREA 1, as shown in FIG. 6.

In operation S130, the second exclusion area EXCLUSION AREA 2 having a threshold voltage less than the third read level VREAD3, which is less than the first read level VREAD1, may be set. The PUF circuit 200 may set the lowest bit cell group LBCG having a lowest threshold voltage into the second exclusion area EXCLUSION AREA 2, as shown in FIG. 6.

In operation S140, the third exclusion area EXCLUSION AREA 3 having a threshold voltage equal to or greater than the fourth read level VREAD4, which is greater than the second read level VREAD2, may be set. The PUF circuit 200 may set the highest bit cell group HBCG having a highest threshold voltage into the third exclusion area EXCLUSION AREA 3, as shown in FIG. 6.

In FIG. 8, operations S120, S130, and S140 are shown as being performed sequentially. However, embodiments are not limited thereto, and operations S120 to S140 may be performed in a different order from the order set forth above. For example, operations S120 to S140 may be performed in the order of S130, S120, and S140.

In operation S150, the PUF reference voltage may be set. In an embodiment, the PUF reference voltage may be set to a threshold voltage corresponding to the upper 50% of the threshold voltages of the second memory cell group 312. In an embodiment, the PUF reference voltage may be set to an average value of the highest threshold voltage and the lowest threshold voltage among the threshold voltages of the second memory cell group 312.

In operation S160, the output OUT2 of the second memory cell group 312 may be obtained by applying the PUF reference voltage to the second memory cell group 312. Among the memory cells of the second memory cell group 312, memory cells having threshold voltages equal to or greater than the PUF reference voltage may output a first bit value, and memory cells having threshold voltages less than the PUF reference voltage may output a second bit value. For example, the memory cells having threshold voltages equal to or greater than the PUF reference voltage may output "0", and the memory cells having threshold voltages less than the PUF reference voltage may output "1".

In operation S170, the PUF data PUF_DATA may be generated by excluding, from the output OUT2 of the second memory cell group 312, the output of the first exclusion area EXCLUSION AREA 1, the output of the second exclusion area EXCLUSION AREA 2, and the output of the third exclusion area EXCLUSION AREA 3. The PUF circuit 200 may exclude the output of the first exclusion area EXCLUSION AREA 1, the output of the second exclusion area EXCLUSION AREA 2, and the output of the third exclusion area EXCLUSION AREA 3 from the output OUT2 of the second memory cell group 312, and then, may generate the remaining output OUT2 of the second memory cell group 312 as the PUF data PUF_DATA.

In an embodiment, operation S170 may include identifying the number of pieces of PUF data PUF_DATA. By identifying the number of pieces of PUF data PUF_DATA, it may be checked whether the number of pieces of PUF data PUF_DATA exceeds a threshold level.

In an embodiment, operation S170 may include, when the number of pieces of PUF data PUF_DATA is equal to or less than the threshold level, repeatedly generating the PUF data PUF_DATA such that the number of pieces of PUF data PUF_DATA is greater than the threshold level.

In an embodiment, operation S170 may include, when the number of pieces of PUF data PUF_DATA exceeds the threshold level, setting an area obtained by excluding the first exclusion area EXCLUSION AREA 1, the second exclusion area EXCLUSION AREA 2, and the third exclusion area EXCLUSION AREA 3 from the second memory cell group 312 to the PUF output area.

Figure 9A:
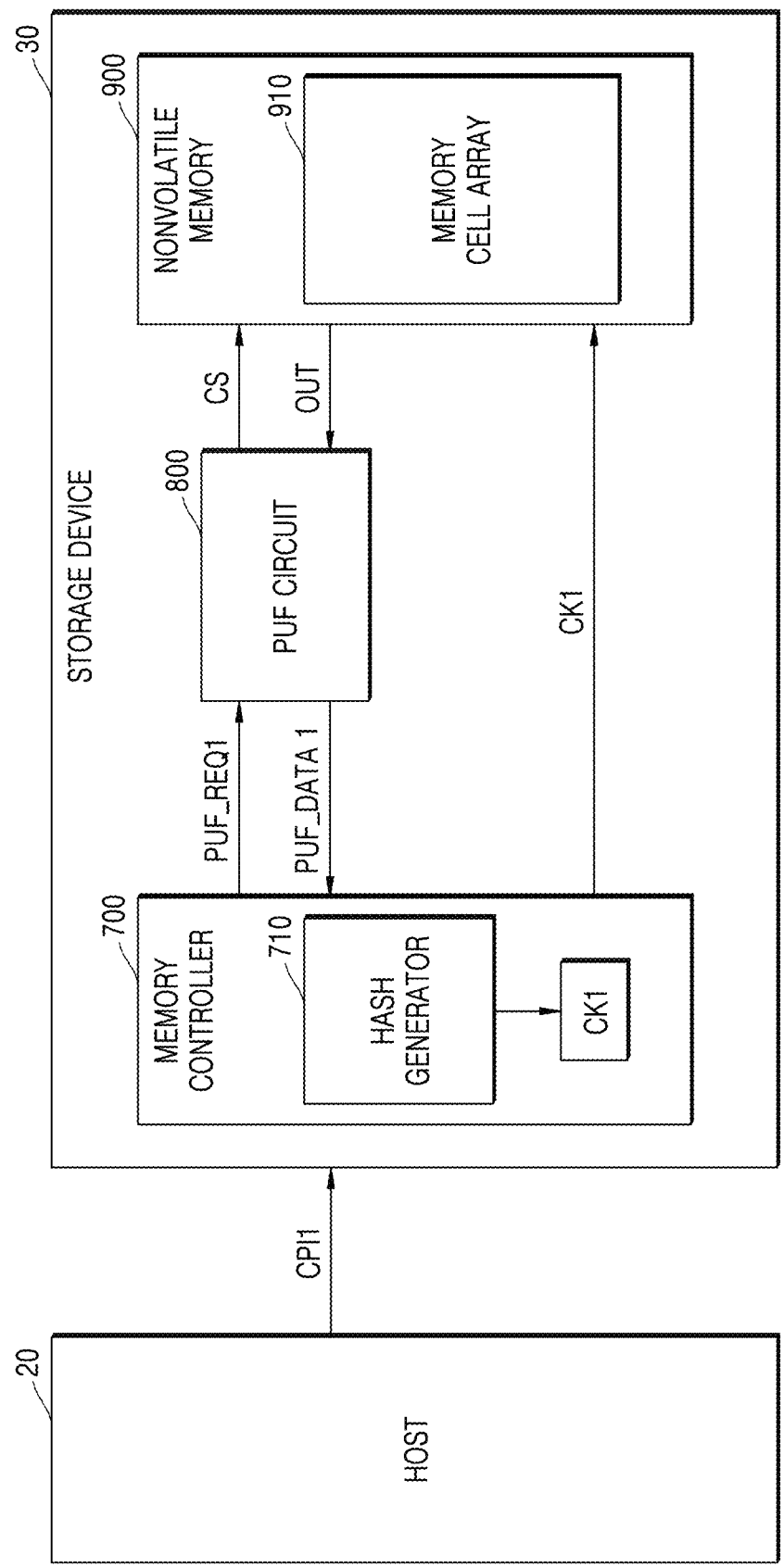
FIGS. 9A and 9B are block diagrams each illustrating a secure authentication operation according to an embodiment.
Figure 9B:
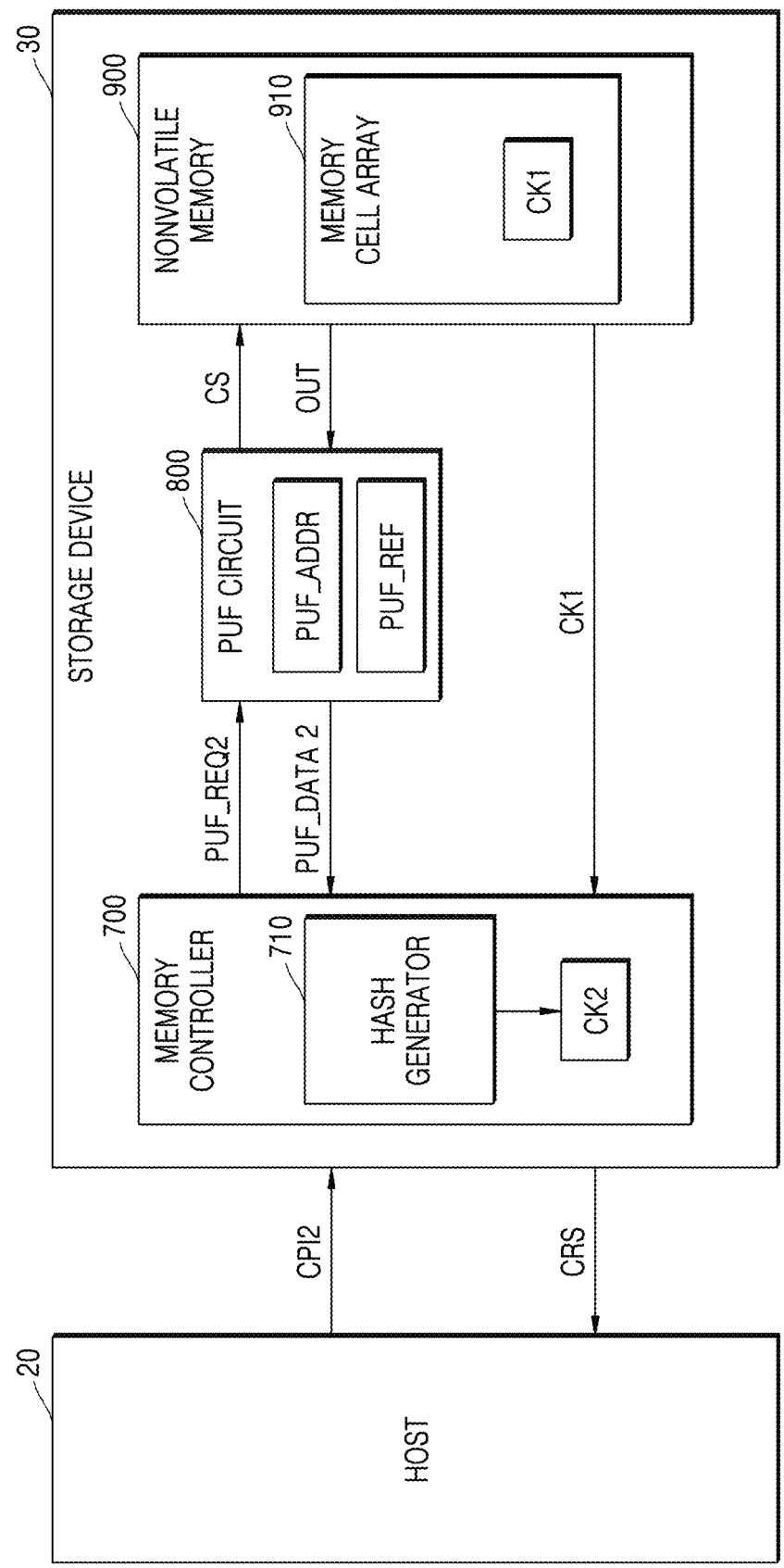

FIGS. 9A and 9B are block diagrams each illustrating a secure authentication operation according to an embodiment. Descriptions regarding FIGS. 9A and 9B may be made with reference to FIG. 6. FIG. 9A is a diagram illustrating an operation of generating a first authentication key CK1, based on first authentication pin information CPI1 received from a host 20. FIG. 9B is a diagram illustrating an operation of generating a second authentication key CK2, when second authentication pin information CPI2 is received after the first authentication pin information CPI1 is received from the host 20.

Referring to FIGS. 9A and 9B, a storage device 30 may include a memory controller 700, a PUF circuit 800, and a nonvolatile memory 900. The memory controller 700 may include a hash generator 710 to perform a hashing operation. The nonvolatile memory 900 may include a memory cell array 910. The memory cell array 910 may include a plurality of pages respectively connected to a plurality of word lines, as shown in FIG. 3.

The memory controller 700 may perform a program operation on the memory cell array 910, and the PUF circuit 800 may obtain a distribution of the memory cell array 910 as a result of the program operation. In an embodiment, the PUF circuit 800 may set a threshold voltage of a memory cell, which corresponds to the upper 50% in the distribution of the memory cell array 910, as the PUF reference voltage. In an embodiment, the PUF circuit 800 may set an average of the highest threshold voltage value and the lowest threshold voltage value in the distribution of the memory cell array 910 as the PUF reference voltage.

The memory controller 700 may transmit a first PUF data request signal PUF_REQ1 to the PUF circuit 800, based on the first authentication pin information CPI1 received from the host 20. The PUF circuit 800 may transfer the control signal CS for obtaining an output OUT of the memory cell array 910 to the nonvolatile memory 900, based on the first PUF data request signal PUF_REQ1. The control signal CS may indicate the PUF reference voltage. The nonvolatile memory 900 may provide, to the PUF circuit 800, the output OUT of the memory cell array 910, which is generated by applying the PUF reference voltage to the memory cell array 910, based on the control signal CS.

The PUF circuit 800 may generate first PUF data PUF_DATA1 by excluding, from the output OUT of the memory cell array 910, the output of the first exclusion area EXCLUSION AREA 1 having a threshold voltage equal to or greater than the first read level VREAD1 and less than the second read level VREAD2, the output of the second exclusion area EXCLUSION AREA 2 having a threshold voltage less than the third read level VREAD3 that is less than the first read level VREAD1, and the output of the third exclusion area EXCLUSION AREA 3 having a threshold voltage equal to or greater than the fourth read level VREAD4 that is greater than the second read level VREAD2. The PUF circuit 200 may transfer the first PUF data PUF_DATA1 to the memory controller 700.

The PUF circuit 800 may store, in the PUF information memory 220, the address 223 of the PUF output area obtained by excluding the first exclusion area EXCLUSION AREA 1, the second exclusion area EXCLUSION AREA 2, and the third exclusion area EXCLUSION AREA 3 from the memory cell array 910, as shown in FIG. 2. In addition, the PUF circuit 800 may store, in the PUF information memory 220, the PUF reference voltage (for example, 222 in FIG. 2) used to generate the first PUF data PUF_DATA1.

The hash generator 710 of the memory controller 700 may generate the first authentication key CK1 by performing a hashing operation, based on the first authentication pin information CPI1 and the first PUF data PUF_DATA1. The memory controller 700 may transfer the first authentication key CK1 to the nonvolatile memory 900, and the nonvolatile memory 900 may store the first authentication key CK1 in the memory cell array 910.

Referring to FIG. 9B, the memory controller 700 may transmit a second PUF data request signal PUF_REQ2 to the PUF circuit 800, based on second authentication pin information CPI2 received from the host 20. The PUF circuit 800 may transfer the control signal CS for obtaining the output OUT of the memory cell array 910 to the nonvolatile memory 900, based on the second PUF data request signal PUF_REQ2. The control signal CS may indicate information about the PUF reference voltage (for example, 222 in FIG. 2) stored in the PUF information memory (for example, 220 in FIG. 2).

The nonvolatile memory 900 may provide, to the PUF circuit 800, the output OUT of the memory cell array 910, which is generated by applying the PUF reference voltage to the memory cell array 910, based on the control signal CS.

The PUF circuit 800 may generate second PUF data PUF_DATA2, based on the address 223 of the PUF output area, which is stored in the PUF information memory (for example, 220 in FIG. 2). Specifically, the PUF circuit 800 may generate the second PUF data PUF_DATA2 by causing the output OUT of the memory cell array 910, which corresponds to the address 223 of the PUF output area, to be included in the second PUF data PUF_DATA2 and by causing the output OUT of the memory cell array 910, which does not correspond to the address 223 of the PUF output area, to be not included in the second PUF data PUF_DATA2.

The PUF circuit 800 may generate the second PUF data PUF_DATA2 at a higher speed than generating the first PUF data PUF_DATA1 by using the address 223 of the PUF output area, which is stored in the PUF information memory 220. The PUF circuit 800 may transfer the second PUF data PUF_DATA2 to the memory controller 700. The hash generator 710 of the memory controller 700 may generate the second authentication key CK2 by performing a hashing operation, based on the second authentication pin information CPI2 and the second PUF data PUF_DATA2.

The memory controller 700 may verify whether the second authentication key CK2 is consistent with the first authentication key CK1 that is read from the nonvolatile memory 900.

The memory controller 700 may provide an authentication response signal CRS to the host 20, according to a result of the verification. The authentication response signal CRS may be an authentication success signal or an authentication failure signal. Specifically, when the second authentication key CK2 is consistent with the first authentication key CK1 that is read from the nonvolatile memory 900, the memory controller 700 may provide the authentication success signal to the host 20. On the other hand, when the second authentication key CK2 is inconsistent with the first authentication key CK1 that is read from the nonvolatile memory 900, the memory controller 700 may provide the authentication failure signal to the host 20.

Figure 10:
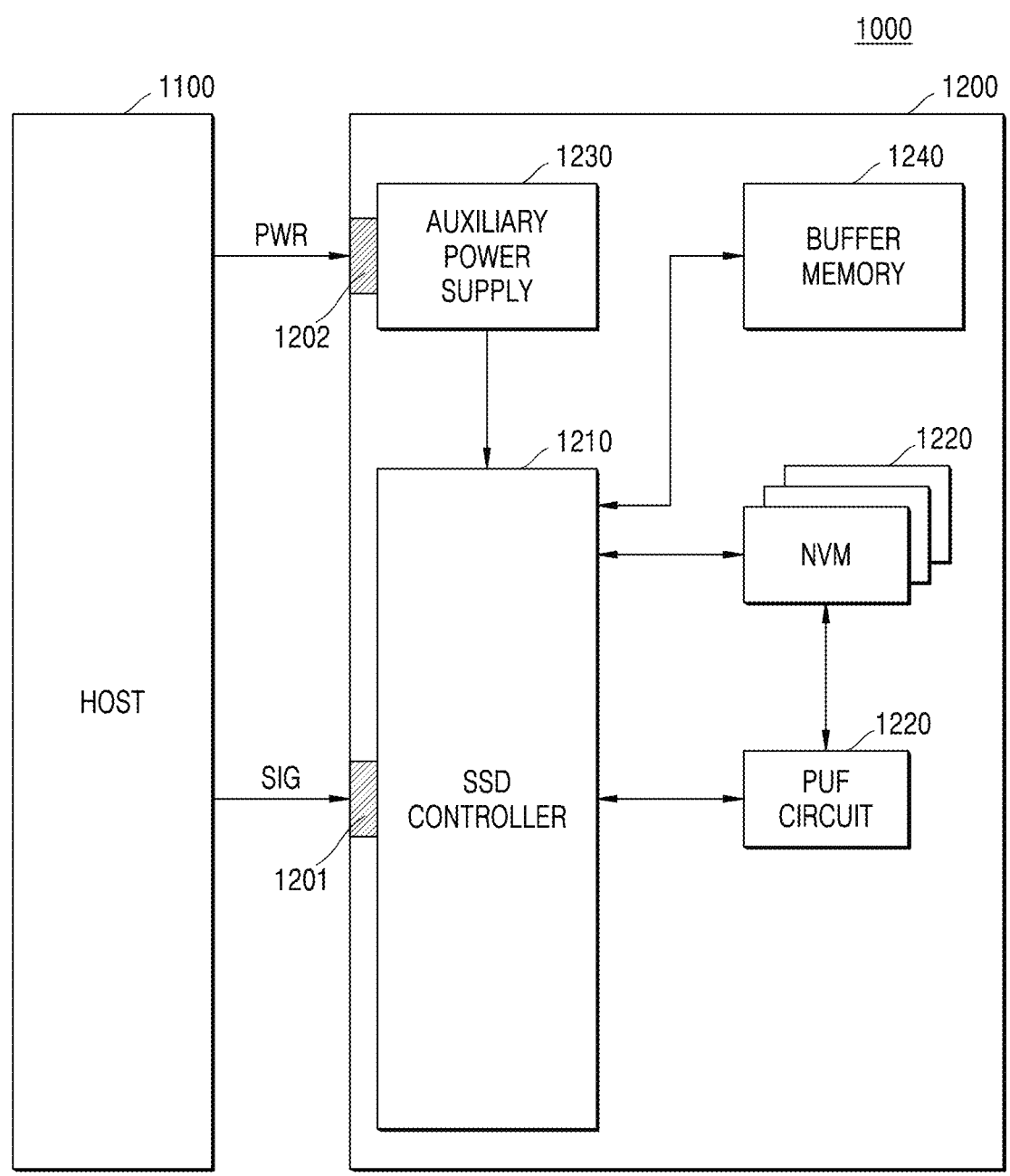
FIG. 10 is a block diagram illustrating a solid-state drive (SSD) system according to an embodiment.

FIG. 10 is a block diagram illustrating an SSD system according to an embodiment. Descriptions regarding FIG. 10 may be made with reference to FIGS. 1, 2, and 6. Referring to FIG. 10, an SSD system 1000 may include a host 1100 and an SSD 1200. The SSD 1200 may exchange signals with the host 1100 through a signal connector (e.g., a signal interface) and may receive power input thereto through a power connector (e.g., a power interface). The SSD 1200 may include an SSD controller 1210, a nonvolatile memory 1220, an auxiliary power supply 1230, a buffer memory 1240, and a PUF circuit 1250. Here, the SSD 1200 may be implemented by the storage device described above with reference to FIGS. 1 to 9B.

As described above, the nonvolatile memory 1220 may include a memory cell array, and the memory cell array may include a plurality of memory cells.

The plurality of memory cells may be set into a first memory cell group and a second memory cell group, according to whether a memory cell is used for generating the PUF data PUF_DATA.

The PUF circuit 1250 may generate the PUF data PUF_DATA, based on the outputs OUT2 of the second memory cell group. Specifically, the PUF circuit 1250 may generate the PUF data PUF_DATA by excluding, from the outputs OUT2 of the second memory cell group, the output of the intermediate bit cell group MBCG having a threshold voltage equal to or greater than the first read level VREAD1 and less than the second read level VREAD2, the output of the lowest bit cell group LBCG having a threshold voltage less than the third read level VREAD3 that is less than the first read level VREAD1, and the output of the highest bit cell group HBCG having a threshold voltage equal to or greater than the fourth read level VREAD4 that is greater than the second read level VREAD2.

In some embodiments, each of the components represented by a block as illustrated in FIGS. 1, 2, 9A, 9B and 10 may be implemented as various numbers of hardware, software and/or firmware structures that execute respective functions described above, according to embodiments. For example, at least one of these components may include various hardware components including a digital circuit, a programmable or non-programmable logic device or array, an application specific integrated circuit (ASIC), transistors, capacitors, logic gates, or other circuitry using use a direct circuit structure, such as a memory, a processor, a logic circuit, a look-up table, etc., that may execute the respective functions through controls of one or more microprocessors or other control apparatuses. Also, at least one of these components may include a module, a program, or a part of code, which contains one or more executable instructions for performing specified logic functions, and executed by one or more microprocessors or other control apparatuses. Also, at least one of these components may further include or may be implemented by a processor such as a central processing unit (CPU) that performs the respective functions, a microprocessor, or the like. Functional aspects of embodiments may be implemented in algorithms that execute on one or more processors. Furthermore, the components, elements, modules or units represented by a block or processing steps may employ any number of related art techniques for electronics configuration, signal processing and/or control, data processing and the like.

While aspects of example embodiments have been particularly shown and described, it will be understood that various changes in form and details may be made therein without departing from the spirit and scope of the following claims.

What is claimed is:

1. A storage device comprising:
   a nonvolatile memory comprising a memory cell array of memory cells divided into a first memory cell group and a second memory cell group;
   a memory controller; and
   a physically unclonable function (PUF) circuit configured to generate PUF data, based on an output of the second memory cell group, by excluding, from the output of the second memory cell group, an output of a first exclusion area, an output of a second exclusion area, and an output of a third exclusion area,
   wherein the first exclusion area has a threshold voltage equal to or greater than a first read level and less than a second read level, the second exclusion area has a threshold voltage less than a third read level that is less than the first read level, and the third exclusion area has a threshold voltage equal to or greater than a fourth read level that is greater than the second read level.

2. The storage device of claim 1, wherein the memory cell array comprises a plurality of pages, and
   wherein the memory controller is further configured to:
      perform a one-shot program operation for programming simultaneously memory cells connected to each of the plurality of pages by applying a program voltage to each of the plurality of pages; and
      identify the second memory cell group based on which of the plurality of pages has an abnormal distribution generated as a result of the one-shot program operation.

3. The storage device of claim 1, wherein the threshold voltage of the first exclusion area corresponds to a PUF reference voltage level that is greater than the first read level and less than the second read level.

4. The storage device of claim 1, wherein the second exclusion area comprises a lowest bit cell group having a lowest threshold voltage in the second memory cell group.

5. The storage device of claim 1, wherein the third exclusion area comprises a highest bit cell group having a highest threshold voltage in the second memory cell group.

6. The storage device of claim 1, wherein the PUF circuit is further configured to identify a number of pieces of PUF data and, based on the number of pieces of PUF data being equal to or less than a threshold number, repeatedly generate the PUF data such that the number of pieces of PUF data is greater than the threshold number.

7. The storage device of claim 1, wherein the PUF circuit is further configured to identify a number of pieces of PUF data and, based on the number of pieces of PUF data being equal to or less than a threshold number, generate the PUF data after changing the second memory cell group to another area of the memory cell array.

8. The storage device of claim 1, wherein the PUF circuit comprises:
   a PUF information memory; and
   a PUF controller configured to identify a number of pieces of PUF data and, based on the number of pieces of PUF data being greater than a threshold level, store, in the PUF information memory, an address of a PUF output area obtained by excluding the first exclusion area, the second exclusion area, and the third exclusion area from the second memory cell group.

9. The storage device of claim 8, wherein the PUF circuit is further configured to set a threshold voltage of a memory cell, which corresponds to an upper 50% of the second memory cell group in terms of threshold voltage, to a PUF reference voltage.

10. A method of operating a storage device, which comprises a memory cell array and a physically unclonable function (PUF) circuit to support a PUF, the method comprising:
    identifying a first memory cell group and a second memory cell group of the memory cell array;
    setting a first exclusion area, which has a threshold voltage equal to or greater than a first read level and less than a second read level, in the second memory cell group;
    setting a second exclusion area, which has a threshold voltage less than a third read level that is less than the first read level, in the second memory cell group;
    setting a third exclusion area, which has a threshold voltage equal to or greater than a fourth read level that is greater than the second read level, in the second memory cell group;
    setting a PUF reference voltage;
    obtaining an output of the second memory cell group by applying the PUF reference voltage to the second memory cell group; and
    generating PUF data by excluding, from the output of the second memory cell group, an output of the first exclusion area, an output of the second exclusion area, and an output of the third exclusion area.

11. The method of claim 10, wherein the memory cell array comprises a plurality of pages, and
    wherein the setting of the memory cell array into the first memory cell group and the second memory cell group comprises:
       performing a one-shot program operation for simultaneously programming memory cells connected to each of the plurality of pages by applying a program voltage to each of the plurality of pages; and
       identifying a page having a normal distribution as a result of the one-shot program operation as part of the first memory cell group and identifying a page having an abnormal distribution as a result of the one-shot program operation as part of the second memory cell group.

12. The method of claim 10, wherein the generating the PUF data by excluding, from the output of the second memory cell group, the output of the first exclusion area, the output of the second exclusion area, and then output of the third exclusion area comprises:
    identifying a number of pieces of PUF data; and
    based on the number of pieces of PUF data being equal to or less than a threshold level, repeatedly generating the PUF data such that the number of pieces of PUF data is greater than the threshold level.

13. The method of claim 10, wherein the generating the PUF data by excluding, from the output of the second memory cell group, the output of the first exclusion area, the output of the second exclusion area, and the output of the third exclusion area comprises:
  identifying a number of pieces of PUF data; and
  based on the number of pieces of PUF data being greater than a threshold level, setting, to a PUF output area, an area obtained by excluding the first exclusion area, the second exclusion area, and the third exclusion area from the second memory cell group.

* * * * *